United States Patent
Riley

[11] 3,986,459
[45] Oct. 19, 1976

[54] SEAT MOUNTING STRUCTURE
[75] Inventor: Norman Riley, Miami, Fla.
[73] Assignee: Hoover Industries, Inc., Miami, Fla.
[22] Filed: Jan. 10, 1975
[21] Appl. No.: 540,180

[52] U.S. Cl. .......................... 105/345; 244/118 P; 248/429
[51] Int. Cl.² ....................................... B61D 33/00
[58] Field of Search .......... 105/345, 464, 465, 482; 244/118 P; 248/503, 119 R, 429, 424

[56] References Cited
UNITED STATES PATENTS

| | | | |
|---|---|---|---|
| 1,961,653 | 6/1934 | Van Deest | 248/429 |
| 2,605,064 | 7/1952 | Davis | 105/345 X |
| 3,377,040 | 4/1968 | Hansen | 248/119 R |
| 3,392,954 | 7/1968 | Malitte | 248/429 |
| 3,605,637 | 9/1971 | Prete, Jr. | 105/482 |
| 3,652,050 | 3/1972 | Marrujo et al. | 248/429 |
| 3,677,195 | 7/1972 | Prete, Jr. | 105/482 |

FOREIGN PATENTS OR APPLICATIONS
437,562  10/1935  United Kingdom ................. 248/429

Primary Examiner—L. J. Paperner
Assistant Examiner—James M. Slattery
Attorney, Agent, or Firm—Oltman and Flynn

[57] ABSTRACT

A seat for a railway car is mounted on and slidable along a floor mounted track having upwardly facing openings interconnected by undercut slots. A base for a leg of the seat carries studs which have heads insertable in the openings of the track and engageable with the track when lifted. The leg's base also carries a threaded plunger between the studs which can be screwed into and out of a selected track opening for locking and releasing the seat and for lifting and lowering the heads into and out of engagement with the track.

3 Claims, 8 Drawing Figures

SEAT MOUNTING STRUCTURE

BACKGROUND OF THE INVENTION

Seats in aircraft have been slidably mounted on tracks and held down by means of fittings. Some fittings can be inserted through the base of the seat leg, screwed into the track, and held in place by a lock nut. Other fittings have heads and a spring biased locking plunger which extends into the track when released. A track mounting is believed to be advantageous for railway cars, but known fittings have not been entirely satisfactory. For example, the above mentioned fittings would rattle when subjected to the severe vibrations which occur in a railway car in normal use. A rattleproof fixture has been proposed, for example in U.S. Pat. 3,620,171, but is believed to be unduly complicated.

SUMMARY OF THE INVENTION

The present invention provides a seat mounting structure in which a seat slidable along a track can be locked in a selected horizontal position and locked in a manner which prevents rattling. A threaded plunger is carried between studs on a base of the seat leg. When the plunger is screwed into an opening in the track, it locks the seat horizontally and also lifts heads of the studs into engagement with the track in a manner which substantially prevents rattling. The invention is particularly suitable for seats of railway cars. Accordingly, it is an object of the invention to mount a seat in a railway car such that it can be moved back and forth, locked in a selected position, and locked in a manner which prevents substantial rattling.

Another object of the invention is to make the seat slide easily when unlocked.

A further object of the invention is to facilitate locking of the seat in a selected position even though the locking mechanism may not be readily visible.

Other objects of this invention will appear from the following description and appended claims, reference being had to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Figure 1:
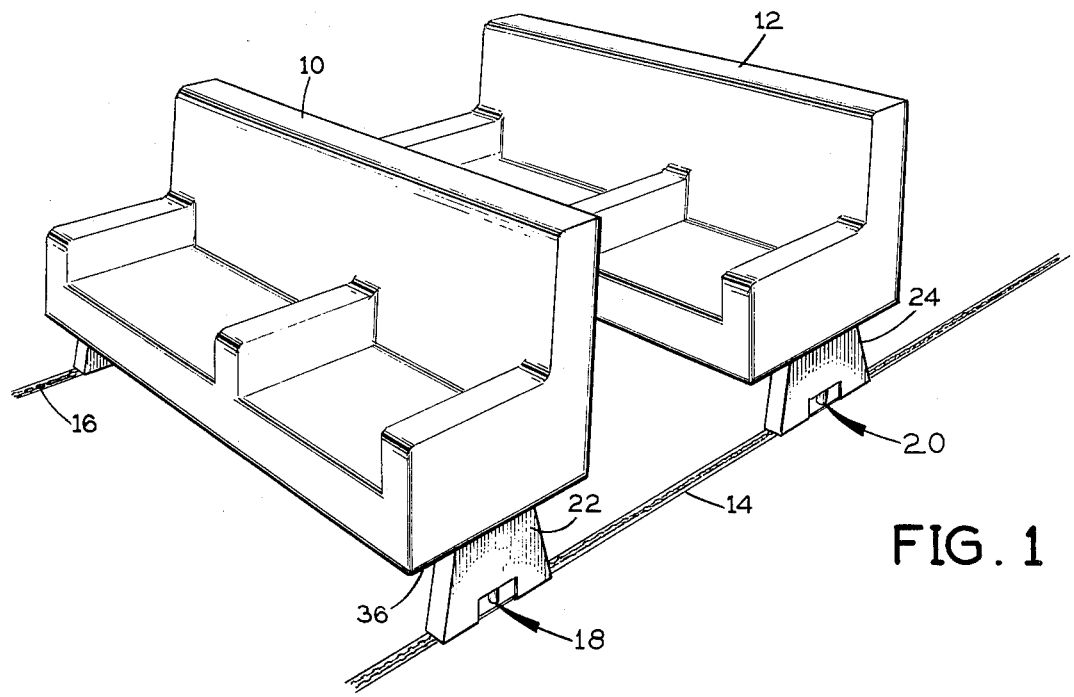
FIG. 1 is a perspective view of seats mounted on a track in a railway car.

In FIG. 1, seats 10 and 12 are shown mounted on tracks 14 and 16 which are attached to the floor of a railway car. The seats can slide back and forth along the tracks, and they can be set in a desired position and locked in place. The locking units 18 and 20 are part of the seat-mounting structure and are built into the legs 22 and 24 of the seats. Locking units may also be provided in the other legs which are not visible.

Figure 2:
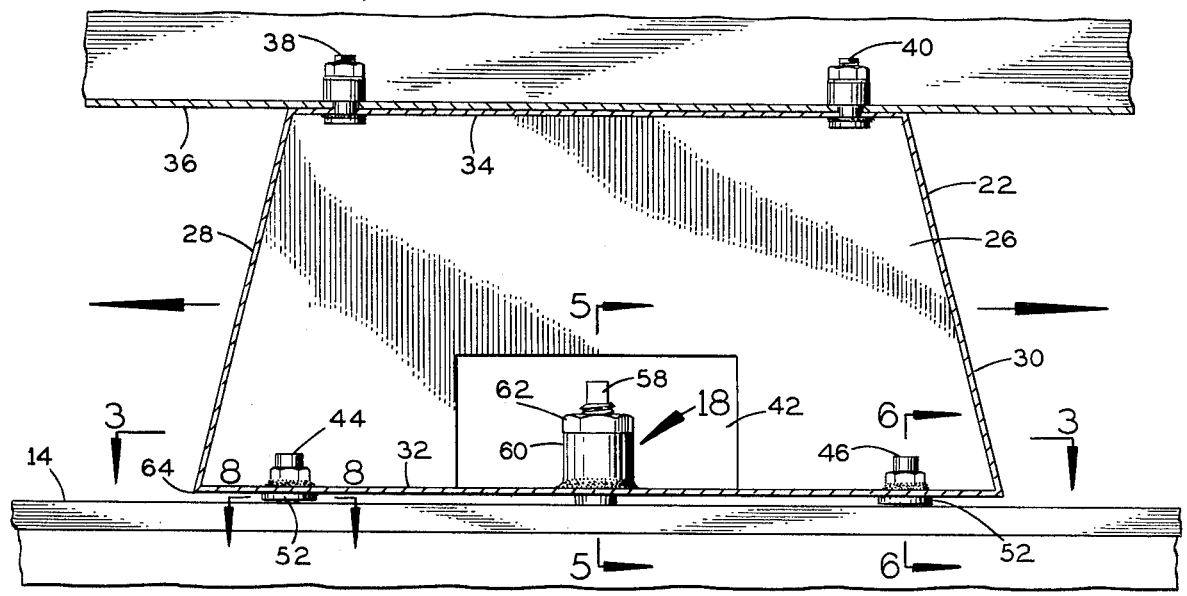
FIG. 2 is a vertical sectional view taken through a leg of one of the seats in FIG. 1.
Figure 3:
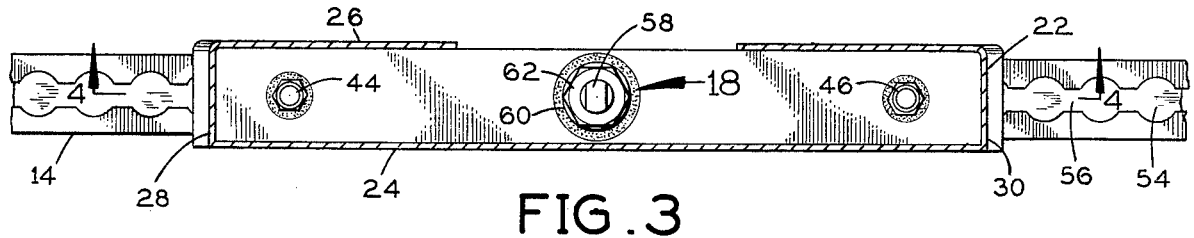
FIG. 3 is a horizontal sectional view taken along line 3—3 of FIG. 2.
Figure 4:
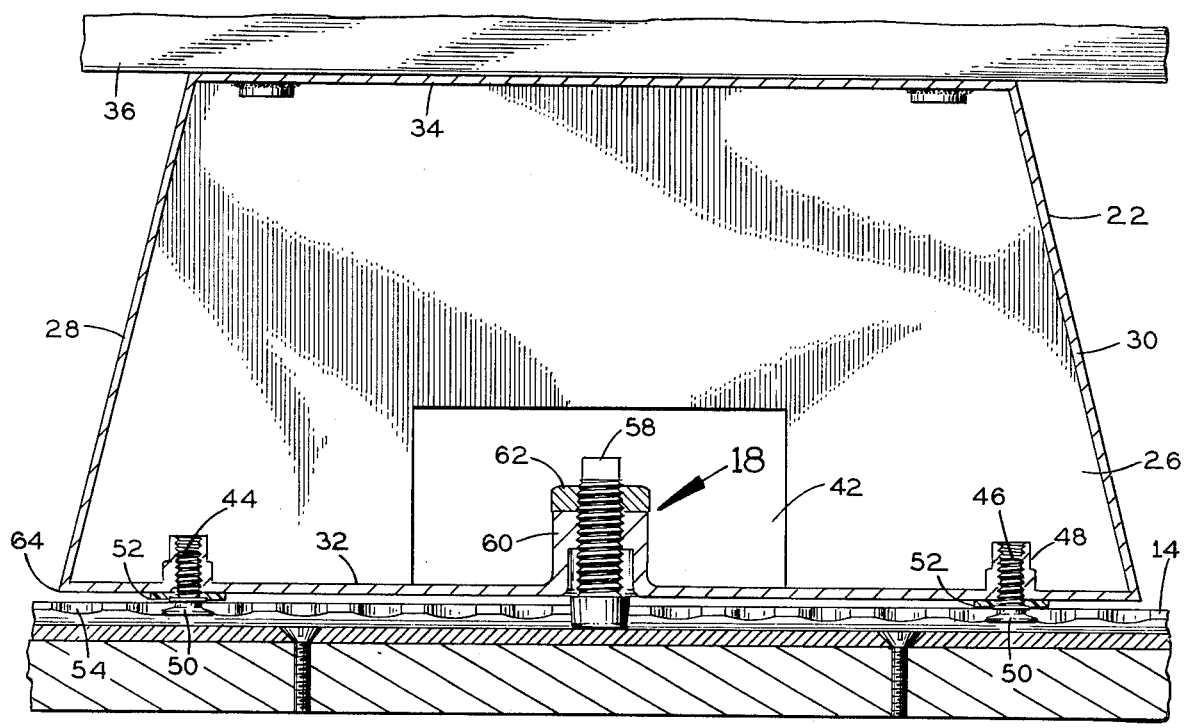
FIG. 4 is a view similar to FIG. 2 but showing the track and locking mechanism in section.

The interior of leg 22 is shown particularly in FIGS. 2, 3, and 4. Leg 22 comprises a hollow casing having side walls 24, 26, 28 and 30, an elongated base wall 32 and a top wall 34. The top wall 34 is rigidly attached to the bottom frame 36 of the seat 10 as with bolts 38 and 40. The side wall 26 has an opening 42 which provides access to the locking unit 18. The opening 42 may alternatively be in side wall 24 or in both walls 24 and 26.

The base 32 of leg 22 carries the locking unit 18 and also carries two studs 44 and 46. The studs 44 and 46 are near the opposite ends of the base 32, and the locking unit 18 is located at the center of the base 32 between the studs.

Figure 8:
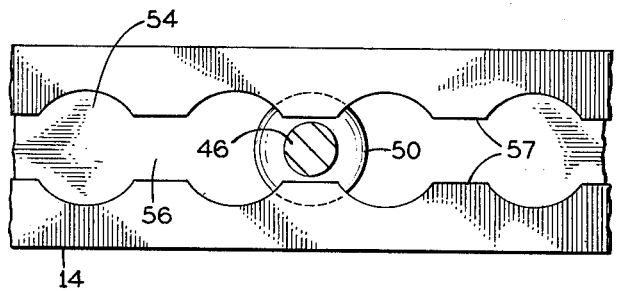
FIG. 8 is a horizontal sectional view taken along line 8—8 of FIG. 2.
Figure 6:
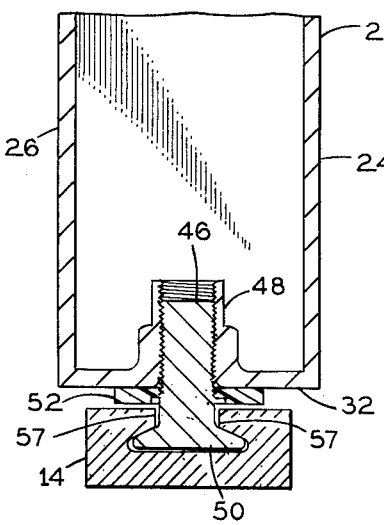
FIG. 6 is a vertical sectional view of a stud taken along line 6—6 of FIG. 2.

The stud 46 illustrates the construction of both studs, as shown particularly in FIGS. 6 and 8. Stud 46 is threaded and is screwed into a collar 48 which is welded to the base 32 of leg 22. There is an enlarged head 50 at the lower end of stud 46. A bearing or slide 52 is mounted on stud 46 immediately under the base 32. Slide 52 is made of slippery plastic material such as "Teflon" and makes it easier for the seat to slide along the track 14.

The track 14 has a plurality of openings 54 facing upwardly, and the openings 54 are interconnected by narrower slots 56 which are undercut below lips 57 so as to receive the head 50. The head 50 is insertable through any one of the openings 54, and can slide along the track with the stud 46 passing through the slots 56. The slide or bearing 52 rides along the top of the track 14 facilitating sliding movement of the seat.

Figure 5:
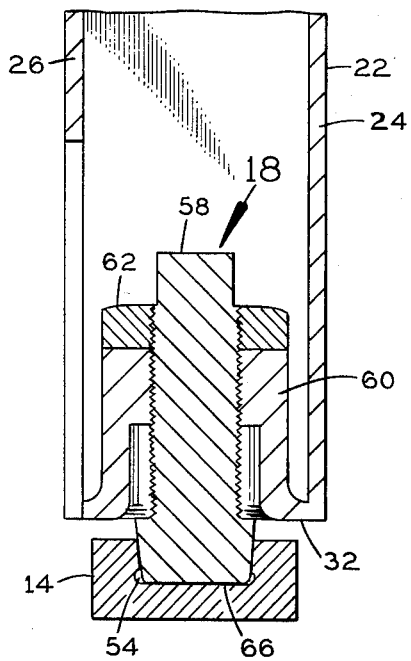
FIG. 5 is a vertical sectional view of a locking plunger taken along line 5—5 of FIG. 2.
Figure 7:
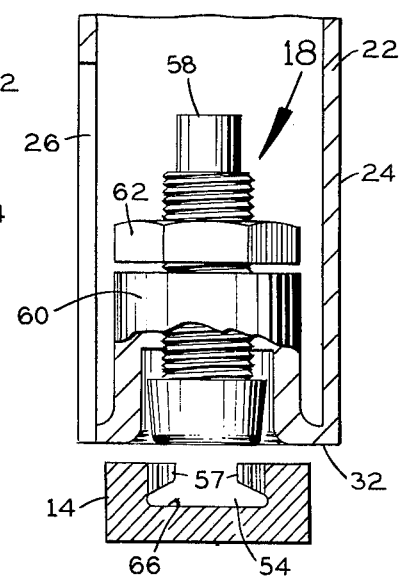
FIG. 7 is a view similar to FIG. 5 but showing the plunger in a raised position.

The locking unit 18 is shown particularly in FIGS. 5 and 7. It consists of a locking plunger 58 which is threaded and screwed through an internally threaded housing 60 welded to the base 32. The locking plunger 58 can be screwed into an opening 54 in the track 14 to lock the seat in place as shown in FIG. 5, or the locking plunger 58 can be screwed out of the opening 54 as shown in FIG. 7 in order to release the seat for adjustment. The locking plunger 58 is held in place by a lock nut 62.

In the operation of a seat-mounting structure, the locking plunger is adjusted to the release position as shown in FIG. 7. The seat 10 is adjusted back and forth along the track 14 to a desired position. The edge 64 of the leg 22 is lined up with a predetermined portion of a particular opening 54, such as one edge of the opening as shown in FIG. 4. The locking plunger 58 comes into alignment with an opening 54 and the studs 44 and 46 are received in slots 56 in the manner shown in FIGS. 4 and 8.

The locking plunger 58 is then screwed fully down into an opening 54 (FIG. 5) until it bears against the surface 66 of the track. The plunger is adjusted downwardly still further so as to lift the heads 50 of the studs 44 and 46 into engagement with the top lips 57 of the track 14 as shown in FIG. 6. Thus, all parts of the seat-mounting structure are tightly engaged so as to minimize rattling when subjected to the severe vibrations which occur in a railway car in its normal use.

The entire seat-mounting structure is normally made of metal except for the plastic slides such as 52. The construction is solid, rugged and durable. There are no unusually critical tolerances. The seat can be located in a given position quickly and easily and locked firmly in place.

Having thus described my invention, I claim:

1. In a seat structure including a seat having a leg with a base and a track along which said base slides for adjustment, the track having upwardly facing openings spaced along the length thereof and interconnected by undercut slots, the improvement comprising a pair of studs affixed to said base and received in said track, said studs being spaced along said base lengthwise of said track and having heads insertable in said openings and engageable with said track at said slots when lifted, a threaded plunger affixed to said base between said studs and screwable into and out of a selected one of said opening for locking and releasing said seat and for lifting and lowering said heads into and out of engagement with said track at said slots, said plunger being mounted at the center of said base and said studs being mounted towards opposite ends of said base, lock nut means threaded on said plunger for locking said plunger at a given position of adjustment, and plastic slide means mounted on each of said studs under said base and engageable with said track for facilitating sliding of said base on said track.

2. A seat structure as claimed in claim 1 including a housing mounted on said base threadedly receiving said plunger.

3. A seat structure according to claim 1 in which said leg has opposite end portions alignable with an edge of selected openings when said plunger is aligned with a selected opening for facilitating adjustment of said seat to a particular position.

* * * * *